UNITED STATES PATENT OFFICE.

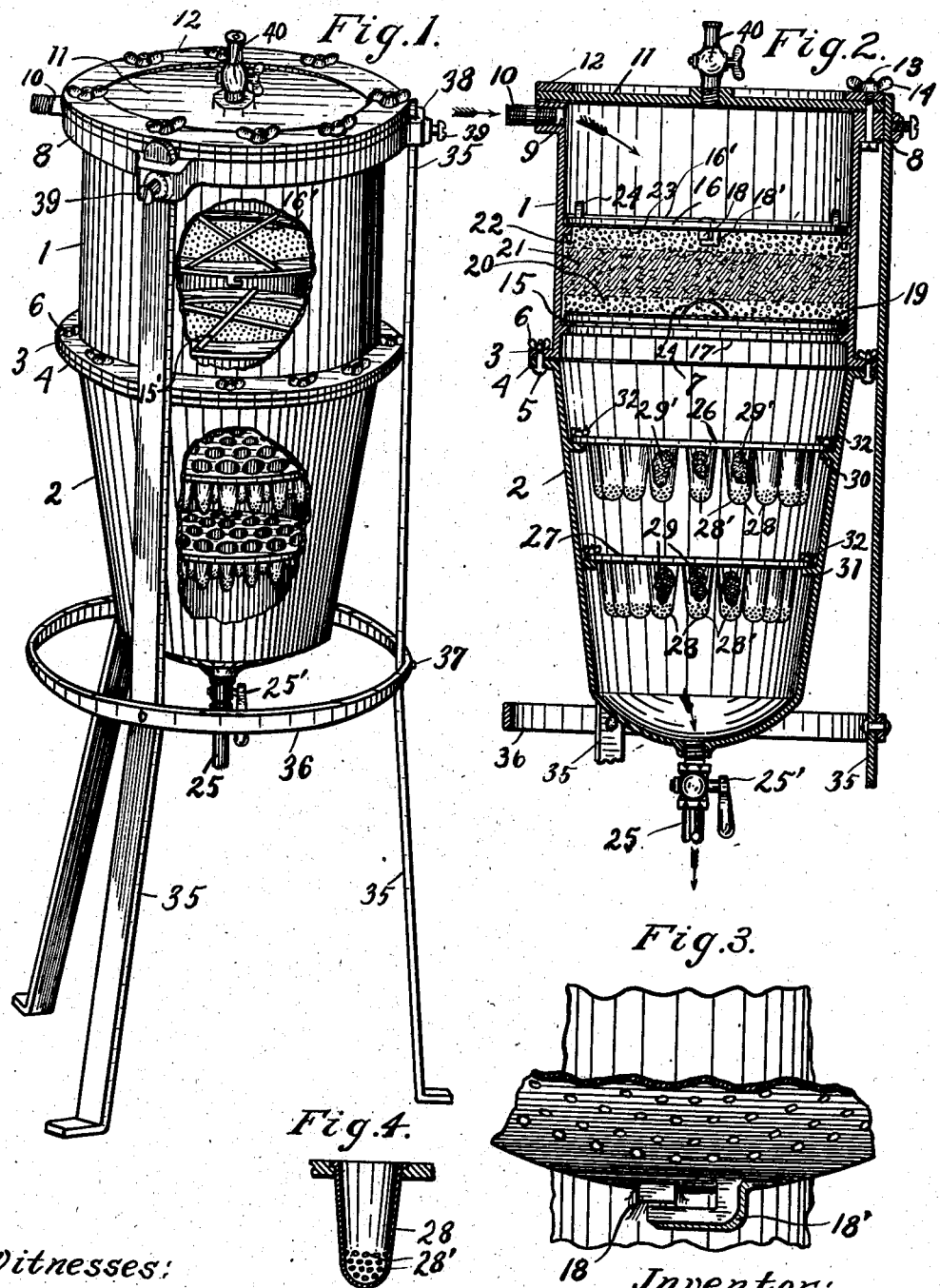

PETER E. MAGGINI, OF LOS ANGELES, CALIFORNIA.

PRESSURE-FILTER.

No. 900,180.    Specification of Letters Patent.    Patented Oct. 6, 1908.

Application filed May 28, 1907. Serial No. 376,209.

*To all whom it may concern:*

Be it known that I, PETER E. MAGGINI, a citizen of the United States, residing at Los Angeles, California, have invented a new and useful Pressure-Filter, of which the following is a specification.

Objects of this invention are to provide a pressure filter of extremely simple and compact construction, in which access may be readily had to the interior of the filter to cleanse or renew the filtering material.

Another object of the invention is to provide improved means for removably supporting the receptacles containing the filtering materials.

Another object of the invention is to provide a pressure filter in which the fluid to be filtered will be under full control when delivered to the filter under heavy pressure, and in which the pressure will not be liable to displace the filtering material.

A further object of the invention is to provide a superior arrangement and construction of filtering cups for holding in place filtering material subjected to heavy pressure.

Other objects and advantages may hereafter appear.

This invention is especially designed for removing albuminous impurities from olive oil, but may be used to remove various impurities from oil or other liquids.

Referring to the accompanying drawings which illustrate the invention, Figure 1 is a perspective view of the entire filter, portions of the case being broken away. In this view the filtering material is omitted to more clearly show interior parts. Fig. 2 is a cross-section of the filter showing the filtering material in place. In this figure, the lower portion of the legs is broken away to contract the view. Fig. 3 is an enlarged perspective view of a fragment of the interior construction of the filter showing means for compressing the filtering material. Fig. 4 is an enlarged cross-section of one of the perforated nipples or cups.

The upright air-tight case of the filter is composed of two separable sections, an upper drum-shaped section 1, and a lower section 2, desirably the shape of an inverted bell. The adjacent ends of these sections are respectively provided with flanges 3 and 4 held together by bolts 5 and thumb-nuts 6. A gasket 7 is provided to make a tight joint between said flanges.

Section 1 is furnished at its upper end with a flange 8 extending around the top thereof, said flange being sufficiently thick to have a threaded hole 9 bored radially therethrough, into which is screwed inlet pipe 10.

11 is a removable head forming a closure for the top of the upper section of the case.

12 is a reinforcing ring through which extend bolts 13, said bolts passing through holes in the head 11, and flange 8.

14 are thumb-nuts screwing onto bolts 13 to clamp head 11 in place.

As shown in the drawings, the upper section of the case contains granular filtering material supported by a perforated plate 15, and covered by another perforated plate 16. Supporting means, desirably a shoulder or ledge 17, is provided to support the lower plate 15.

18 designates lugs with which coöperate depending L-shaped latches 18' to hold upper plate 16 firmly down upon the granular filtering material.

Filtering material is built up on top of plate 15 as follows: First a thin layer of asbestos fiber 19, which is laid upon plate 15: next comes a layer of sand 20: then a layer of charcoal (preferably bone charcoal) 21; then an upper layer of sand 22; then another layer of asbestos fiber 23 next to the lower side of plate 16.

24 designates handles for use in removing plates 15 and 16.

15', 16' are braces riveted or otherwise attached to the sides of plates 15 and 16, to strengthen said plates.

The chamber formed by the lower section 2 of the case tapers downwardly as shown, the outlet pipe 25 being located at the lower end thereof. Said tapering chamber contains a plurality of removable trays, as 26 and 27. Each tray is furnished with a cluster of foraminated, hollow, open-topped cups 28 extending downwardly therebeneath. Said nipples are filled with fibrous filtering material, desirably sterilized cotton 29 in the lower tray 27, and asbestos cotton 29' in the upper tray 26. The asbestos fiber preferred is composed of fine filaments and resembles cotton in appearance.

The trays 26 and 27 are each provided with a cluster of foraminated cups having small perforations only, so that the pressure of fluid entering the open tops of the cups will not be liable to crowd the filtering material through the walls of the cups.

It will be noted that the greater number of the perforations 28' open out laterally through the side wall of the cups, and hence are less likely to become clogged by sediment settling into them than if they were all at the bottom of the cups.

30 and 31 designate shoulders for supporting said trays. Said shoulders are desirably in the form of ledges extending around the chamber of section 2. The inner edge of the upper ledge 30 is of greater diameter than the tray next below, in order not to interfere with lifting the lower tray out of the filter.

32 designates bolts or other fastening means for removably securing the trays in place.

A frame is provided for supporting the case of the filter. 35 are the legs of said frame, and 36 is a bracing hoop, connected to each of the legs by rivets 37, or other fastening devices, desirably at a point near the bottom of the case of the filter.

The upper portions of legs 35 are substantially vertical and extend adjacent to or contact with the periphery of flange 3 with which the upper drum-shaped section 1 of the case is provided. Owing to this construction said legs 35 steadily support said upper section 1 in an upright position when the lower section 2 is detached for the purpose of cleansing the filtering cups. And this desirable result is obtained no matter to what height the upper section is adjusted relatively to the legs. The legs also contact with flange 4 and act as centering means when the lowering section of the filter is put in place.

The granular matter in the upper portion of the filter is best adapted to remove albuminous impurities. The fibrous matter in the filtering cups in the lower section is adapted to retain any fine particles of solid matter and also impurities that tend to discolor the olive-oil. Persons accustomed to filtering olive-oil can tell from the appearance of the oil which filtering material, the fibrous or the granular, first needs to be renewed.

In a filter constructed according to the principles of this invention the fibrous material is confined in one section and the granular material in another section of the filter case, said sections being separable from each other in order that the operator may renew the filtering material of one section without disturbing that in the other. Hence it will be seen that the kind of filtering material used, the arrangement of the filtering material, the construction of the case, and the means for mounting the case, all coöperate to produce new and useful results in the art to which my invention pertains.

Flange 8 at the top of the case is provided with bosses 38, having vertical holes extending therethrough, receiving the upper ends of legs 35.

The legs 35 are ranged around the filter case, and being attached to the upper section thereof, hold said upper section in an upright position when the lower section is let down to inspect or renew the material in the filtering cups.

39 are screws for retaining the case of the filter at whatever height it is desired to adjust it.

40 is a faucet projecting from the head 11 to allow the air to escape when the liquid is allowed to flow into the filter.

25' is a faucet for controlling the flow of liquid through the outlet pipe 25.

The granular filtering material, in the present embodiment of the invention, sand and charcoal, is placed in the upper portion of the filter, as it is best adapted to perform the first step of the filtering process. A relatively large body of this sort of filtering material may be firmly packed into the space above filter plate 15.

The cotton and asbestos fiber are placed in the nipples 28, because it is better adapted to perform the final step in the filtering process, and because it contains no small grains which might close up the perforations 28' in the sides and lower rounded ends of nipples 28.

The oil or other fluid to be filtered may be supplied under pressure to the filter from an elevated tank, or may be furnished under steam or other pressure.

Although I have shown and described what I at present consider the best embodiment of the invention, it is to be understood that various changes of proportion and arrangement, such as fall within the scope of the claims, may be made without departing from the principles of the invention.

The invention is not limited to the use of a cup of any particular shape, although the word "cup" as used in the claims is intended to refer to a vessel having an open top, and a bottom closed in such a manner that the pressure of the fluid as it enters the top of each cup cannot crowd the filtering material through the bottom thereof. It should be noted that if any of the cups had bottom openings so large as to allow the filtering material to be crowded therethrough, such an occurrence would render all the other cups of a cluster practically inoperative by reason of the pressure being relieved therefrom.

I claim:

1. In a filter, in combination, a fluid-tight case composed of upper and lower detachable sections, a set of upright legs supporting said upper section adjacent its upper end, said section being vertically adjustable with relation to said legs, a flange at the lower end of said upper section adapted to guide the vertical movements of said upper section along said legs, a flange extending from the upper end of the lower section of the case, means for detachably securing said flanges together, granular filtering material in the upper section of the case, fibrous filtering material in the lower section of the case, an inlet for the upper section, and an outlet for the lower section.

2. In a filter, in combination, a fluid-tight case composed of upper and lower detachable sections, a set of upright legs supporting said upper section adjacent its upper end, said section being vertically adjustable with relation to said legs, means for securing said sections together to form a fluid-tight case adapted to resist internal pressure, filtering material in the upper section adapted to extract one class of impurities, filtering material in the lower section adapted to extract another class of impurities, inlet means for the upper section and outlet means for the lower section.

3. In a filter, in combination, a fluid-tight case composed of upper and lower detachable sections, a set of upright legs supporting said upper section adjacent its upper end, said section being vertically adjustable with relation to said legs, means for securing said sections together to form a fluid-tight case adapted to resist internal pressure, filtering material in the upper section adapted to extract one class of impurities, filtering material in the lower section adapted to extract another class of impurities, inlet means for the upper section and outlet means for the lower section, said legs being adapted to act as guiding and centering means for the lower section when the same is being elevated to operative position.

4. A filter provided with an elongated upright case consisting of upper and lower sections, means external to said case for detachably holding said sections together, a set of legs ranged around said case, and means for attaching said legs to the upper section of said case, said legs extending along the outer sides of the top section of said case and said top section being vertically adjustable between said legs.

5. In a filter, in combination, a case composed of upper and lower detachable sections, a set of upright legs fastened to and supporting said upper section, said section being vertically adjustable with relation to said legs, means for securing said sections together to form a fluid-tight joint therebetween, filtering material in the upper section adapted to extract one class of impurities, filtering material in the lower section adapted to extract another class of impurities, inlet means for the upper section and outlet means for the lower section.

6. In a filter, in combination, a case composed of upper and lower detachable sections, means external of the case for fastening said sections together at their adjacent ends to form a fluid-tight case, filtering material in the upper section adapted to extract one class of impurities, filtering material in the lower section adapted to extract another class of impurities, inlet means for said upper section, outlet means for said lower section, and supporting means for said case, said supporting means being attached to and vertically adjustable along the sides of the top section of said case.

In testimony whereof I have hereunto signed my name in the presence of two subscribing witnesses at Los Angeles, in the county of Los Angeles and State of California this twenty-second day of May 1907.

PETER E. MAGGINI.

Witnesses:
ALBERT H. MERRILL,
H. W. CHARLTON.